(12) United States Patent
Ishibashi et al.

(10) Patent No.: US 7,658,485 B2
(45) Date of Patent: Feb. 9, 2010

(54) IMAGE FORMING METHOD

(75) Inventors: Daisuke Ishibashi, Tokyo (JP); Kazuo Asano, Tokyo (JP)

(73) Assignee: Konica Minolta Holdings, Inc., Tokyo (JP)

( * ) Notice: Subject to any disclaimer, the term of this patent is extended or adjusted under 35 U.S.C. 154(b) by 523 days.

(21) Appl. No.: 11/468,892

(22) Filed: Aug. 31, 2006

(65) Prior Publication Data

US 2007/0058018 A1    Mar. 15, 2007

(30) Foreign Application Priority Data

Sep. 13, 2005  (JP) ............................. 2005-264999
Aug. 11, 2006  (JP) ............................. 2006-219496

(51) Int. Cl.
     *B41J 2/18* (2006.01)

(52) U.S. Cl. ............................. 347/89; 347/84; 347/85

(58) Field of Classification Search .................. 347/84, 347/85, 89, 100, 101, 95; 523/160
See application file for complete search history.

(56) References Cited

U.S. PATENT DOCUMENTS

| | | | |
|---|---|---|---|
| 2002/0001024 A1* | 1/2002 | Wouters et al. | 347/89 |
| 2004/0228987 A1* | 11/2004 | Tsubaki | 428/32.34 |
| 2005/0270349 A1* | 12/2005 | Sakasai | 347/100 |
| 2006/0148925 A1* | 7/2006 | Yamada et al. | 522/150 |
| 2006/0205841 A1* | 9/2006 | Furuno et al. | 523/160 |
| 2007/0032571 A1* | 2/2007 | Furuno et al. | 523/160 |

* cited by examiner

*Primary Examiner*—Matthew Luu
*Assistant Examiner*—Rut Patel
(74) *Attorney, Agent, or Firm*—Lucas & Mercanti, LLP

(57) ABSTRACT

A method of forming an image containing the step of: ejecting droplets of an ink-jet ink containing water, a colorant and a polymer through a nozzle of an ink-jet head onto an image recording medium, wherein the polymer has a hydrophilic main chain and a plurality of side chains which are capable of cross-linking between the side chains by irradiation with an active energy ray; and a shearing stress is continuously applied to the ink-jet ink in an ink-jet head channel of the ink-jet head during the time when the ink-jet head is in a stand-by condition to eject the droplets of the ink-jet ink.

12 Claims, 3 Drawing Sheets

IMAGE FORMING METHOD

This application is based on Japanese Patent Application Nos. 2005-264999 filed on Sep. 13, 2005 and 2006-219496 filed on Aug. 11, 2006 in Japan Patent Office, the entire contents of which are hereby incorporated by reference.

TECHNICAL FIELD

The present invention relates to an image forming method which forms images on a recording medium employing an ink-jet ink, and in more detail, to an image forming method which results in excellent ejection stability and in minimal feathering during image recording on plain paper, and exhibits improved beading resistance and color bleed resistance for low ink absorbing or non-ink absorbing recording media, and forms images exhibiting excellent abrasion resistance.

BACKGROUND

Ink-jet recording methods enable highly detailed image recording, employing relatively simple devices and have been applied increasingly to various fields. Further, their uses have been diversified, and recording media or ink-jet inks, which meet specific requirements, have been employed.

In recent years, particularly, the recording rate has been greatly enhanced and ink-jet printers, which exhibit performance durable for the application to shortrun printing, have been developed.

However, in ink-jet printers, in order to bring out demanding performance, ink-jet exclusive paper, provided with high absorbability of ink-jet ink, is required.

When recording is carried out on coated paper and art paper provided with minimal absorbability of ink-jet ink, or plastic film provided with no ink absorbability, ink liquids which differ in color are mixed on the recording medium to result in color contamination, whereby so-called color bleed problems occur. When diversity of ink-jet recording systems is provided for recording media, the above drawbacks remain to be overcome.

In order to overcome the above drawbacks, proposed is a hot-melt type ink-jet recording method in which a hot-melt type ink composition, incorporating waxes solid at room temperature, is employed; the above composition is liquidized via heating; the resulting liquid is ejected via any of the applied energy; and is cooled and solidified after deposition on a recording medium, whereby image recording dots are formed (refer to Patent Documents 1 and 2). Since the above hot-melt type ink composition is solid at room temperature, no staining results during handling. Further, since the ink does not evaporate during melting, nozzle clogging is of no concern. Further, since the ink is solidified immediately after deposition onto the recording medium, it has become known that it is possible to provide excellent printing quality irrespective of paper quality with minimal color bleed.

However, at present, images, which are recorded employing such a hot-melt type ink composition, result in drawbacks such as quality degradation or insufficient abrasion resistance due to raised dots since recorded images are composed of soft, and waxy dots.

On the other hand, disclosed is an ink-jet recording ink which is cured via exposure to actinic radiation (Refer to Patent Document 3). Further, proposed is a non-water based ink in which pigments are incorporated as a colorant; at least three-functional polyacrylates are employed as a polymerizable compound; and ketone and alcohol are employed as a primary solvent (refer to Patent Document 4). Still further, proposed is an ink employing water based UV polymerizable monomers (refer to Patent Document 5).

In these image recording methods, in which curing is carried out via exposure to actinic radiation, the ink itself is cured employing curing components, whereby it has become possible to record images on non-absorptive recording media. However, since a large amount of curing components, other than colorants, is incorporated and such components do not sublime, the resultant recording image surface is raised due to the waxy ink dots, to result in unusual image quality, especially unnatural glossiness.

Further, some of the conventional curing components result in problems in regard to safety. Further, though safety may be secured, problems occur in which it is not possible to freely design physical properties due to the narrow range for selecting materials.

Further, considered as an image forming method, applied to low ink absorptive or non-ink absorptive recording media, is one in which fixing is carried out via incorporation of fixing resins. However, problems occur in which ink ejection properties from ink heads are degraded due to the fixing resins. Still further, the ink incorporating polymerizable compounds, as described above, carries problems in which, during ejection from the ink-jet heads, when retained in the ink standing section for an extended period of time, the ink viscosity tends to vary, whereby when ejected from nozzles, ejection variation occurs due to the viscosity variation of the ink.

(Patent Document 1) U.S. Pat. No. 4,391,365
(Patent Document 2) U.S. Pat. No. 4,484,948
(Patent Document 3) U.S. Pat. No. 4,228,438
(Patent Document 4) Examined Japanese Patent Application Publication No. 5-64667
(Patent Document 5) Japanese Patent Publication for Public Inspection (herein after referred to as JP-A) No. 7-224241

SUMMARY

In view of the foregoing problems, the present invention was achieved. An object of the present invention is to provide an image forming method which results in excellent ejection stability of an ink-jet ink via the ink-jet head, and in minimal feathering during image recording on plain paper, and which exhibits improved beading resistance and color bleed resistance for low ink absorbing or non-ink absorbing recording media, and further forms images exhibiting excellent abrasion resistance.

The above object of the present invention is achieved employing the following embodiment.

In an image forming method in which recording is carried out by ejecting, from an ink-jet head, an ink-jet ink incorporating at least a colorant, water, and a polymer compound, an image forming method wherein the aforesaid ink-jet head achieves ejection via shearing of the aforesaid ink-jet ink within the ink-jet head channel.

According to the present invention, it is possible to provide an image forming method which results in excellent ejection stability of an ink-jet ink via an ink-jet head, and in minimal feathering during image recording on plain paper, and exhibits improved beading resistance and color bleed resistance for low ink absorbing or non-ink absorbing recording media, and forms images which exhibit excellent abrasion resistance.

DESCRIPTION OF THE PREFERRED EMBODIMENTS

Figure 1C:
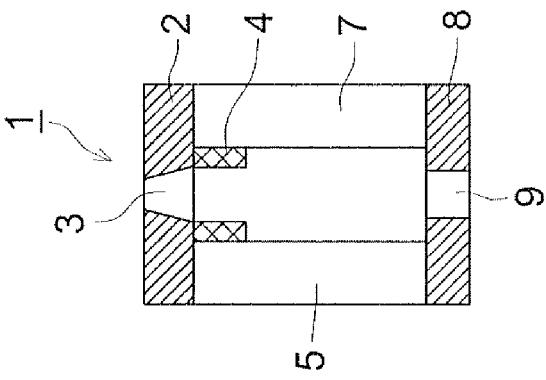
FIGS. 1(a) to 1(c) are schematic drawings showing one example of an ink-jet head fitted with a single aperture section which feeds ink.

The preferred embodiments to practice the present invention will now be detailed.

The present invention can be achieved by employing the following embodiments.

(1) An aspect of the present invention includes a method of forming an image comprising the step of:

ejecting droplets of an ink-jet ink comprising water, a colorant and a polymer through a nozzle of an ink-jet head onto an image recording medium, wherein the polymer comprises a hydrophilic main chain and a plurality of side chains which are capable of cross-linking between the side chains by irradiation with an active energy ray; and a shearing stress is continuously applied to the ink-jet ink in an ink-jet head channel of the ink-jet head during the time when the ink-jet head is in a stand-by condition to eject the droplets of the ink-jet ink.

(2) Another aspect of the present invention includes a method of forming an image, wherein the ink-jet head channel of the ink-jet head has at least two aperture sections for the ink-jet ink; and the shearing stress is continuously applied to the ink-jet ink by circulating the ink-jet ink from one aperture section to another aperture section.

(3) Another aspect of the present invention includes a method of forming an image, wherein a total flow volume of the ink-jet ink in the ink-jet head channel per a unit time is 10 to 10,000 times larger than a total volume of the ink-jet ink ejected from the nozzle.

(4) Another aspect of the present invention includes a method of forming an image, wherein the shearing stress applied to the ink-jet head in the ink-jet head channel is not less than 5 (l/s).

(5) Another aspect of the present invention includes a method of forming an image, wherein the colorant is anionic; and the side chain of the polymer is anionic or nonionic.

(6) Another aspect of the present invention includes a method of forming an image, wherein a content of the polymer in the ink-jet ink is from 0.5 to 5.0 weight % based on the total weight of the ink-jet ink.

(7) Another aspect of the present invention includes a method of forming an image, wherein a partial structure of the polymer comprising the main chain and the side chain is represented by Formula (A):

Poly-$\{(X_1)_m\text{—}[B\text{—}(Y_1)_n]_p\}$  Formula (A)

wherein "Poly" represents a hydrophilic main chain; "$(X_1)_m$—$[B$—$(Y_1)_n]$" represents the side chain in which $X_1$ represents a (p+1) valent linking group, B represents a cross-linking group, and $Y_1$ represents a hydrogen atom or a substituent; m represents 0 or 1; n represents 0 or 1; and p represents an integer, provided that when p represents 2 or more, a plurality of B and $Y_1$ may be the same or different.

(8) Another aspect of the present invention includes a method of forming an image, wherein the hydrophilic main chain is a saponified vinyl acetate; the saponification ratio is 77-99%; and the degree of polymerization is 500-4,000.

(9) Another aspect of the present invention includes a method of forming an image of claim 1, wherein the polymer has a modification ratio of the side chain with respect to the main chain in the range of 1-4 mol %.

(10) Another aspect of the present invention includes a method of forming an image, wherein a water-soluble photopolymerization initiator is further incorporated in the ink-jet ink.

(11) Another aspect of the present invention includes a method of forming an image, further comprising the steps of:

irradiating the ejected ink-jet ink on the image recording medium with an actinic ray; and then drying the ink-jet ink.

(12) Another aspect of the present invention includes a method of forming an image, wherein the image recording medium is plain paper.

(13) Another aspect of the present invention includes a method of forming an image, wherein the image recording medium is art paper or coated paper.

(14) Another aspect of the present invention includes a method of forming an image of claim 11, wherein the image recording medium is a non-absorptive medium.

In view of the foregoing, the inventors of the present invention conducted diligent investigations. As a result, it was discovered that in an image forming method in which recording is carried out by ejecting, from an ink-jet head, an ink-jet ink incorporating at least a colorant, water, and a polymer compound, by employing an image forming method characterized in that the aforesaid ink-jet head affects ejection while applying shear to the aforesaid ink-jet ink in the interior of the ink-jet head channel, an image forming method was realized which resulted in excellent ejection stability of an ink-jet ink via the ink-jet head, and with minimal feathering during image recording on plain paper, and exhibited improved beading resistance and color bleed resistance for low ink absorbing or non-ink absorbing recording media, and formed images exhibited excellent abrasion resistance. Accordingly, the present invention was achieved.

The present invention will now be detailed.

(Ink-Jet Head)

Initially, an ink-jet recording apparatus provided with an ink-jet head applied to the image forming method of the present invention will be described.

In the image forming method of the present invention, employed as an ink-jet head used to eject an ink-jet ink (hereinafter also referred simply to as an ink) may be either an on-demand system or a continuous system. Further listed as an ejection system may be an electrical-mechanical conversion system (for example, a single cavity type, a double cavity type, a vendor type, a piston type, a share mode type, or a shared wall type); an electrical-thermal conversion system (for example, a thermal ink-jet type and BUBBLE JET (a registered trade name) type); an electrostatic suction system (for example, an electric field control type); and a discharge system (for example, a spark jet type). Of these, preferred is the electrical-mechanical conversion system.

In a conventional ink-jet head, an ink-jet ink fed from a single aperture section is retained in an ink-jet head channel and then ejected from the nozzle section based on any of the various ejection systems.

Figure 1A:
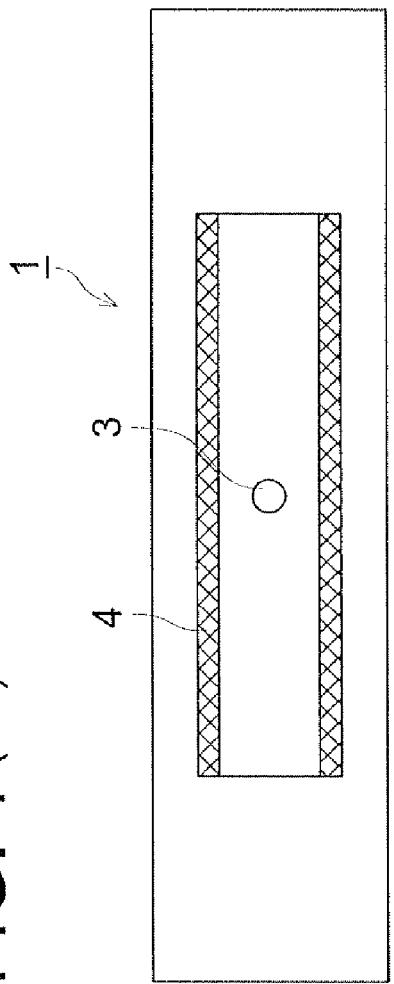
Figure 1B:
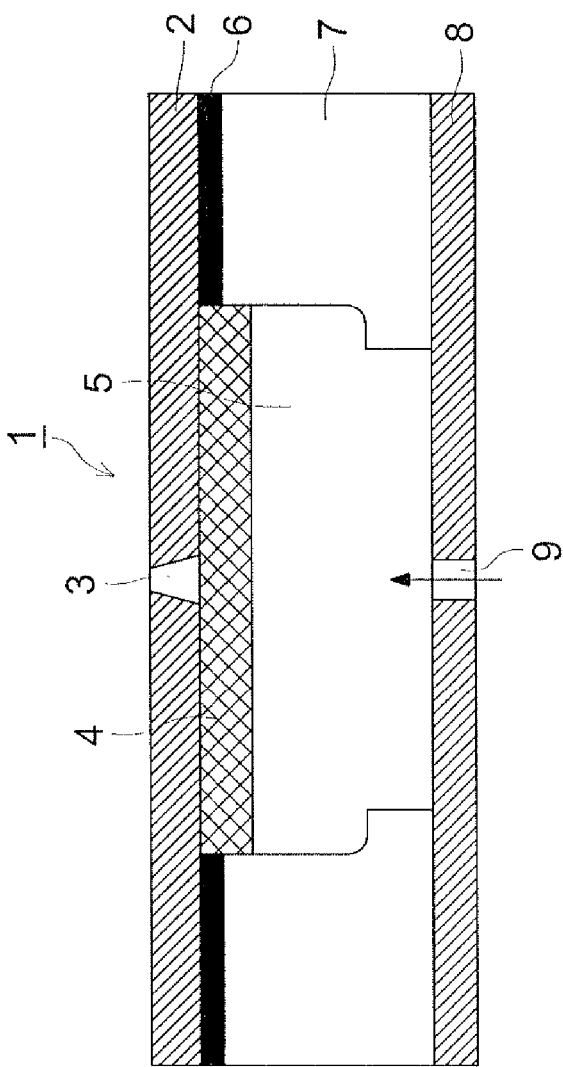

FIGS. 1(a) to 1(c) are schematic drawings showing one example of an ink-jet head having one aperture section which feeds ink.

FIG. 1(a) is a top view, FIG. 1(b) is a cross-sectional view and FIG. 1(c) is a side view.

FIGS. 1(a) to 1(c) illustrate one example of an ink-jet head of the electrical-mechanical conversion system employing a piezoelectric element as an ejection system. In ink-jet head 1, pressure material 7 and electrode 4 are arranged between nozzle plate 2 and cover plate, and ink-jet channel 5, in which is ink is retained, is formed in the space. In nozzle plate 2, arranged is nozzle 3 which ejects an ink-jet ink, while in cover plate 8, arranged is one aperture section 9 is arranged. The ink-jet ink fed from single aperture section 9 is conveyed to ink-jet channel 5 and retained. When voltage is applied based on image forming signals, the piezoelectric material is subjected to displacement to result in a pressure wave in ink-jet head channel 5, whereby the ink-jet ink is ejected from the nozzle surface in the form of minute droplets. Such heads are disclosed in Japanese Patent Publication Open to Public Inspection (under PCT Application) Nos. 2001-519264 and 2003-50213.

In the system described in FIGS. 1(a) to 1(c), though an ink-jet ink composed of common colorants and water-soluble organic solvents is retained in a still state in an ink-jet head channel for an extended period of time, the ink results in no significant viscosity variation and its stable ejection can be carried out.

Contrary to the above, the following was noted. When an ink-jet ink incorporating colorants according to the present invention, water, and polymer compounds was ejected employing an ink-jet head having a single aperture section feeding ink, as described in FIGS. 1(a) to 1(c), the ink viscosity varied along with the retention in ink-jet head channel 5, whereby it was not possible to carry out stable ejection.

In order to overcome the above drawback, the ink-jet head according to the present invention is characterized in that within the ink-jet head channel, ejection is carried out while constantly applying shear to the ink-jet ink.

In the present invention, several methods are considered in which shear is applied to the ink-jet ink in the ink-jet channel. Considered are a method in which a movable section is arranged in the channel and is vibrated, and another method in which ink flow in the ink-jet head channel is facilitated. Cited as the preferred method is one in which the ink head channel is fitted with two aperture sections which are connected to the ink tank and shear is applied to the ink-jet ink in the ink-jet head channel by flowing the ink-jet ink from one aperture section to the other.

Figure 2C:
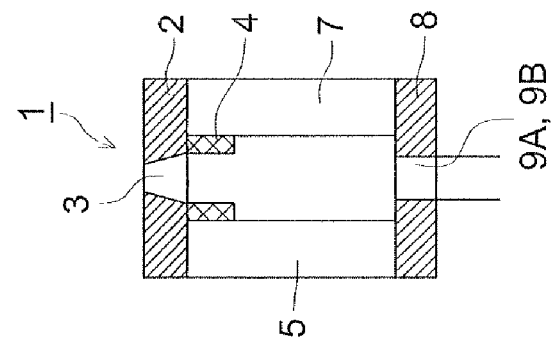
FIGS. 2(a) to 2(c) are schematic drawings showing one example of the ink-jet head of the present invention, fitted with two aperture sections.
Figure 2A:
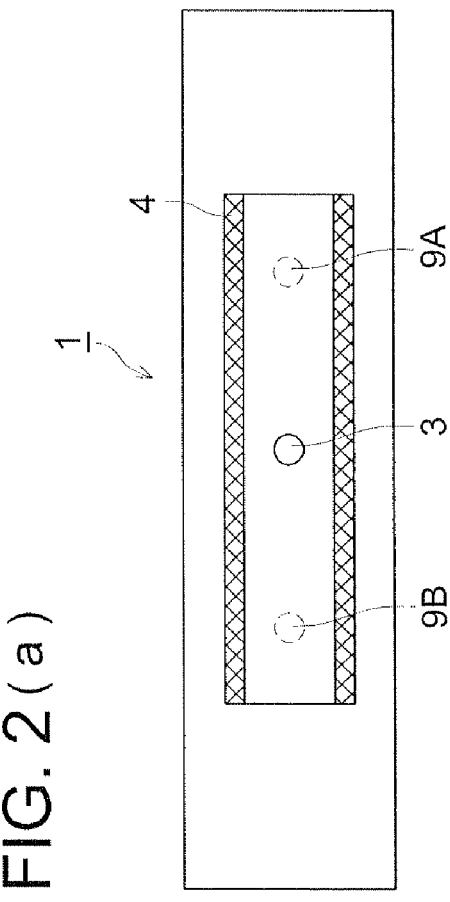
Figure 2B:
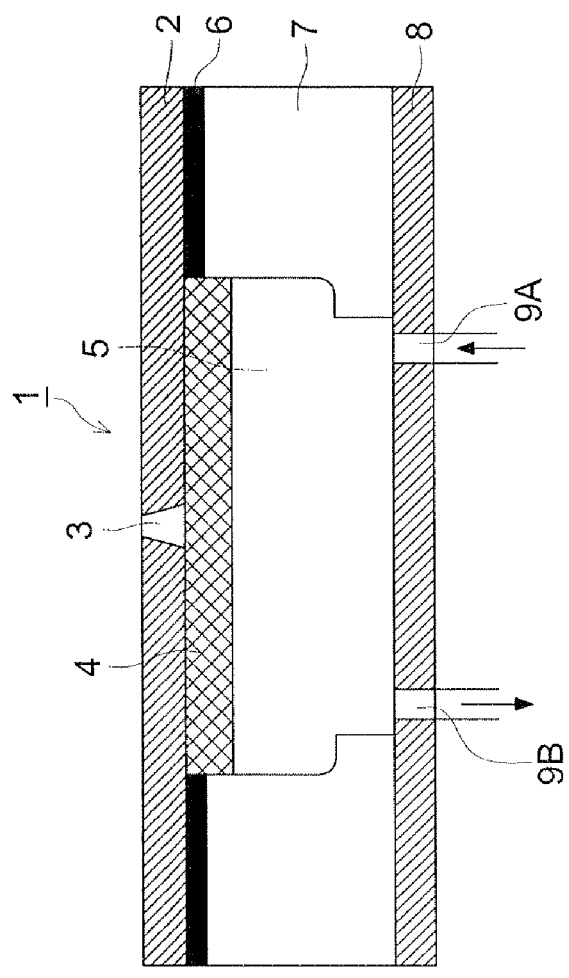

FIGS. 2(a) to 2(c) are schematic drawings showing an example of the ink-jet head of the present invention, provided with two aperture sections.

FIG. 2(a) is a top view, FIG. 2(b) is a cross-sectional view and FIG. 2(c) is a side view.

The basic constitution of an ink-jet head is the same as that described in above FIGS. 1(a) to 1(c). Cover plate 8 is provided with aperture sections 9A and 9B, and ink is circulated between the aperture section and an ink tank. To circulate the ink, it is possible to employ a common pump and an actuator employing a piezo element. By employing such a unit, ink is fed at a constant rate from aperture section 9A to ink-jet head channel 5 and is then discharged from ink-jet channel 5 through aperture section 9B, whereby flow velocity is constantly generated in the ink-jet channel. Namely shear is applied to the ink, whereby it is possible to stably maintain ink viscosity.

Figure 3A:
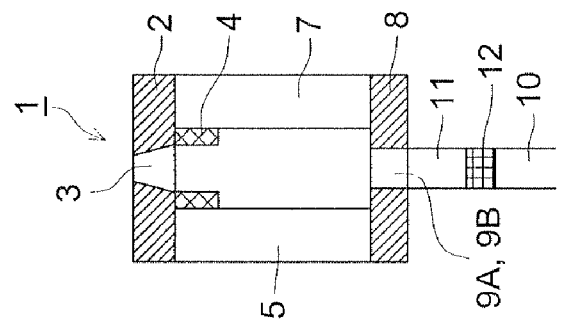
FIGS. 3(a) to 3(c) are schematic drawings showing another example of the ink-jet head of the present invention, fitted with two aperture sections.
Figure 3B:
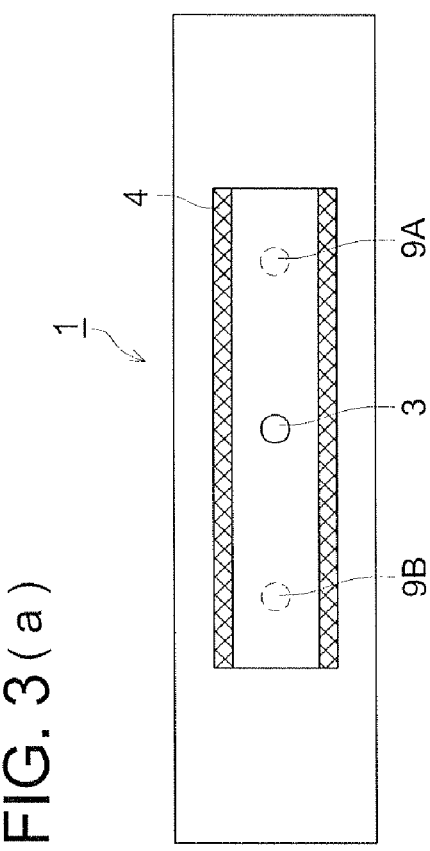
Figure 3C:
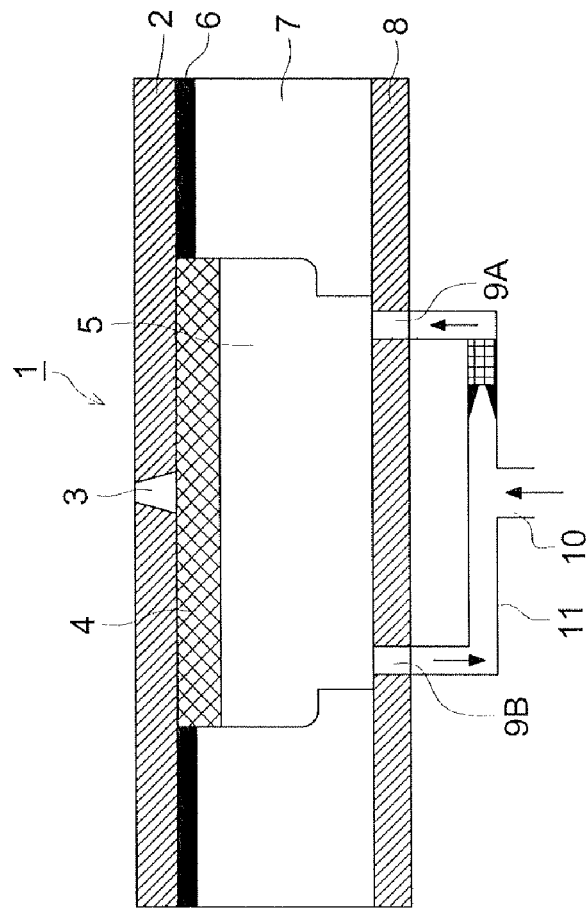

FIGS. 3(a) to 3(c) show another basic constitution provided with two aperture sections.

FIGS. 3(a) to 3(c) are basically the same as FIGS. 2(a) to 2(c). Two aperture sections 9A and 9B are connected via ink channel 11, and ink is circulated by arranging at 12 an actuator composed of a piezo element, whereby flow velocity is generated. Namely, shear is applied, whereby it is possible to maintain stable ink viscosity. Ink consumed via ejection is replenished via feeding aperture 10 provided in one section of ink channel 11.

Reasons which make it possible to achieve stable ejection by constantly applying shear to the ink, as described above, are assumed as follows. Polymer compounds incorporated in the ink according to the present invention exhibit structural viscosity and the viscosity varies depending on the magnitude of shearing force, whereby the viscosity in the channel varies depending on the ejecting state and ejection properties are affected. Further, it is assumed that by realizing constant shearing in the channel, the viscosity in the channel is maintained at a constant value and does not adversely affect ejection prosperities, whereby it is possible to achieve stable ejection.

Accordingly, in the image forming method of the present invention, the magnitude of shear applied in the ink-jet head channel is not particularly specified. A necessary condition is that shear is applied.

The flow amount in the channel is preferably 10-10,000 times the ink volume discharged from the nozzles. When the ink flow amount is less than 10 times that ejected from the nozzles, the ink flow amount tends to vary depending on the driving state, whereby applied shear is not stable. On the other hand, when it is at least 10,000 times, ejection is also not stable. One cause for instability is assumed to be that ink tends to be pushed out from the nozzle surface due to the flow rate. Further, shear applied to the ink in the channel is preferably at least 5(l/s).

The ink-jet ink according to the present invention is characterized in incorporating at least a colorant, water, and a polymer compound.

(Polymer Compounds)

Polymer compounds, which are usable in the ink-jet ink according to the present invention, are not particularly limited but are preferably hydrophilic. Examples include saponified polyvinyl acetate, polyvinyl acetal, polyethylene oxide, polyalkylene oxide, polyvinylpyrrolidone, polyacrylamide, polyacrylic acid, hydroxyethyl cellulose, methyl cellulose, and hydroxypropyl cellulose.

Further, it is preferable that in the image forming method of the present invention, polymer compounds are those which have a plurality of side chains on the hydrophilic main chain and can crosslink among the side chains when exposed to actinic radiation.

Compounds, preferably employed in the present invention, will now be detailed, and are those which have a plurality of side chains on the hydrophilic main chain and can crosslink among the side chains when exposed to actinic radiation.

(Actinic Radiation Cross-linkable Polymer Compounds)

Polymer compounds according to the present invention, which have a plurality of side chains on the hydrophilic main chain and can crosslink among the side chains when exposed to actinic radiation, refer to those in which modifying groups such as a photo-dimerization type, a photodecomposition type, a photopolymerization type, a photo-modification type, or a photo-depolymerization type are introduced into at least one hydrophilic resin selected from the group consisting of saponified polyvinyl acetate, polyvinyl acetal, polyethylene oxide, polyalkylene oxide, polyvinylpyrrolidone, polyacrylamide, polyacrylic acid, hydroxyethyl cellulose, methyl cellulose, and hydroxypropyl cellulose, or derivatives of the above hydrophilic resins, and copolymers thereof. In view of image capturing speed and performance of resultant images, the photopolymerization type cross-linkable group is preferred.

Preferred combinations exist between the ionicity of colorants and the ionicity of the side chain of polymer compounds. In view of enhancing image durability, ink retention properties, and continuous ejection properties, it is preferable to combine selected anionic colorants, and nonionic or anionic side chains. Nonionic side chains are most preferred. Reasons for the above are not well understood. In the case of combinations of the above ions, ink decomposition as well as ink association decrease, and these facts may results in the above effects.

It is preferable that a partial structure of the hydrophilic main chains and side chains of actinic radiation cross-linkable polymer compounds is represented by following Formula (A).

Poly-$\{(X_1)_m-[B-(Y_1)_n]_p\}$      Formula (A)

In above Formula (A), Poly represents a hydrophilic main chain such as saponified polyvinyl acetate, polyvinyl acetal, polyethylene oxide, polyalkylene oxide, polyvinylpyrrolidone, polyacrylamide, polyacrylic acid, hydroxyethyl cellulose, methyl cellulose, and hydroxypropyl cellulose, or derivatives of the above hydrophilic resins, as well as copolymers thereof.

$\{\ \}$ represents a side chain. In the side chain, $X_1$ represents a (P+1) valent linking group, where p represents a positive integer and is preferably an integer of 1-5. Specifically, in the case of p=1, $X_1$ represents a divalent cross-linking group, such as an alkylene group, an arylene group, a heteroarylene group, an ether group, a thioether group, an imino group, an amido group, or a sulfonyl group. Further, these may be combined to form a divalent or higher valent group. Still further, in the case of p=2, a plurality of B and Y may be the same or different.

Cited as $X_1$ is a divalent or higher valent linking group preferably combined with at least alkylene oxide and an aromatic group.

B represents a cross-linking group, and specifically represents a group having a double bond or a triple bond. Examples include an acryl group, a methacryl group, a vinyl group, an allyl stoup, a diazo group, and an azido group. Of these, preferred are the acryl group and the methacryl group.

$Y_1$ represents a hydrogen atom or a substituent. Specific examples of substituents, as described herein, include a halogen atom (for example, a fluorine atom and a chlorine atom); an alkyl group (for example, methyl, ethyl, butyl, benzyl, 2-methoxyethyl, trifluoromethyl, 2-ethylhexyl, and cyclohexyl); an aryl group (for example, phenyl, p-tolyl, and naphthyl); an acyl group (for example, acetyl, propionyl, and benzoyl); an alkoxy group (for example, methoxy, ethoxy, and butoxy); an alkoxycarbonyl group (for example, methoxycarbonyl and i-propoxycarbonyl); an acyloxy group (for example, acetyloxy and ethylcarbonyloxy); a carbamoyl group (for example, methylcarbamoyl, ethylcarbamoyl, butylcarbamoyl, and phenylcarbamoyl); a sulfamoyl group (for example, sulfamoyl, methylsulfamoyl, dimethylsulfamoyl, and phenylsulfamoyl); an alkylthio group (for example, methylthio, ethylthio, and octylthio); an arylthio group (for example, phenylthio and p-tolylthio); an alkylureido group (for example, methylureido, ethylureido, methoxyureido, and dimethylureido); an arylureido group (for example, phenylureido); an alkylsulfonamido group (for example, methanesulfonamido, ethanesulfonamido, butanesulfonamido, trifluoromethylsulfonamido, and 2,2,2-trifluoroethylsuldonamido); an arylsulfonamido group (for example, phenylsulfonamido and trisulfonamido); an alkylaminosulfonylamino group (for example, methylaminosulfonylamino and ethylaminosulfonylamino); an arylaminosulfonylamino group (for example, phenylaminosulfonylamino); a hydroxyl group; a heterocyclyl group (for example, pyridyl, pyrazolyl, imidazolyl, furyl, and thienyl). These groups may further have a substituent.

"m" represents 0 or 1, and "n" represents 0 or 1.

In the main hydrophilic chain, in view of simplicity of introduction to side chains and ease of handling, saponified polyvinyl acetate is preferred. The saponification ratio is preferably 77-99%, and in view of handling, the degree of polymerization is commonly 300-4,000, but is preferably 500-2,000. In view of reactivity, the modification ratio of side chains with respect to the main hydrophilic chain is preferably 1.0-4.0 mol %. When the modification ratio is at most 1.0 mol %, effects of the present invention are degraded due to insufficient cross-linkability, while when it is at least 4 mol %, the resultant cross-linking density increases, whereby the strength of the layer is degraded due to formation of a hard and brittle layer.

Preferably represented as a partial structure of the main hydrophilic chain and side chains of actinic radiation cross-linkable polymer compounds according to the present invention are those represented by following Formulas (1)-(9).

For example, the photosensitive resins described in JP-A No. 60-129742 are the compounds represented by following Formula (1) in which a cationic side chain, which is a stilbazonium group, is introduced into a polyvinyl alcohol structure.

Formula (1)

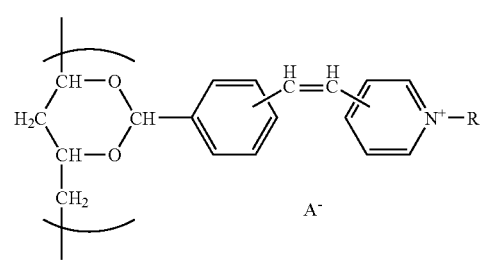

In above Formula (1) $R_1$ represents an alkyl group having 1-4 carbon atoms, and $A^-$ represents a counter anion.

The photosensitive resins described in JP-A No. 56-67309 are resinous compositions having, in a polyvinyl alcohol structure, the side chain of the 2-azido-5-nitrophenylcarbonyloxyethylene structure represented by following Formula (2), or the side chain of the 4-azido-3-nitrophenylcarbonyloxyethylene structure (being nonionic) represented by following Formula (3).

Formula (2)

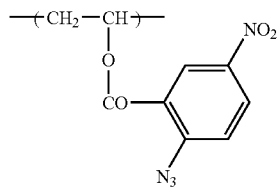

Formula (3)

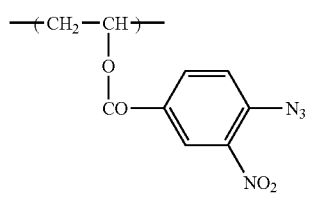

Further, preferably employed is the side chain of the modified group (being anionic), represented by following Formula (4).

Formula (4)

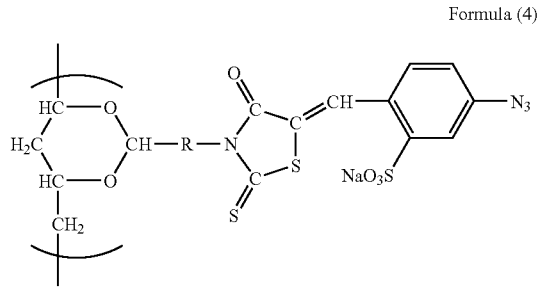

In above Formula (4), R represents an alkylene group or an aromatic ring, but preferably represents a benzene ring.

In view of reactivity, preferred as a photopolymerization type modified group are resins (being nonionic), represented by following Formula (5) described, for example, in JP-A Nos. 2000-181062 and 2004-189841.

Formula (5)

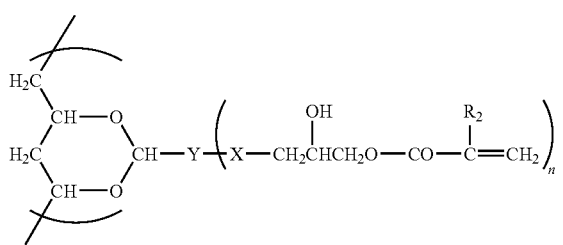

In above Formula (5), $R_2$ represents a methyl group or a hydrogen atom; n represents 1 or 2; X represents —$(CH_2)_m$—COO— or —O—; Y represents an aromatic ring or a single bond; and m represents an integer of 0-6.

Further, it is also preferable to apply, to conventional water-soluble resins, the modifying group (being nonionic) represented by following Formula (6) which is of the photopolymerization type, described in JP-A No. 2004-161942.

Formula (6)

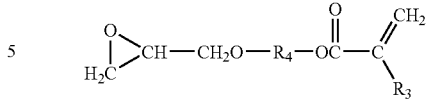

In above Formula (6), $R_3$ represents a methyl group or a hydrogen atom and $R_4$ represents a straight chain or branched chain alkylene group having 2-10 carbon atoms.

Further, the modifying groups (being nonionic), represented by following Formulas (7)-(9), are also preferably employed.

Formula (7)

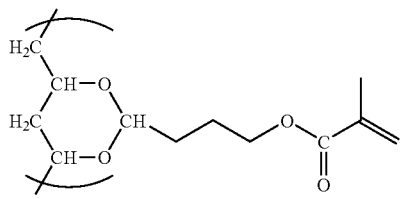

Formula (8)

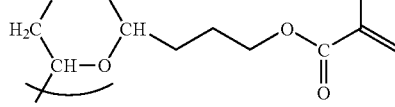

Formula (9)

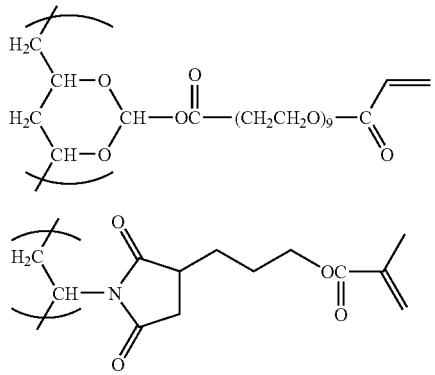

Such actinic radiation cross-linking type polymer compounds are preferably incorporated in the range of 0.5-5.0% by weight with respect to the total ink weight. When they are incorporated in an amount of at least 0.5% by weight, cross-linking efficiency is enhanced, whereby beading and color bleed become more acceptable due to a rapid increase in the ink viscosity after cross-linking. Further, in view of ejection properties and ink retention properties, the added amount of at most 5.0% by weight is preferred since physical properties of ink and the state in the ink-jet head are not adversely affected.

In actinic radiation cross-linking polymer compounds according to the present invention, cross-linking is carried out via a cross-linking bond among side chains with respect the main chain which inherently exhibits, to some extent, polymerization capability. As a result, a molecular weight increasing effect per single photon is quite pronounced with respect to actinic radiation curing type polymer compounds which undergo polymerization via a common chain reaction. On the other hand, in the actinic radiation curing type polymer compounds known in the art, since it is not possible to control the number of cross-linking points, it is also not possible to control the physical properties of the coating formed after curing. As a result, the resulting coating tends to be brittle.

In the polymer compounds according to the present invention, it is possible to completely control the number of cross-linking points via the length of the hydrophilic main chain and the introduction amount of side chains, whereby it is possible to control the targeted physical properties of the coating.

Further, except for colorants, almost all the parts of the actinic radiation curable type ink known in the art are composed of curing components. Due to that, ink dots after curing are raised, which degrades image quality in terms of glossiness. Contrary to this, the necessary amount of the polymer compounds employed in the present invention to form a layer is less and the amount of components to be dried is greater, whereby the image quality after drying is enhanced and better fixability is also achieved.

(Photopolymerization Initiators and Sensitizers)

In the present invention, it is preferred to incorporate photopolymerization initiators (including photosensitizers). Photopolymerization initiators may be dissolved in or dispersed into solvents, or may be chemically bonded to photosensitive resins.

Employed photopolymerization initiators are not particularly limited, and it is possible to employ those known in the art. However, in view of miscibility and reaction efficiency, water-soluble photopolymerization initiators are preferred. Specifically, in view of miscibility with water based solvents, 4-(2-hydroxyethoxy)phenyl(2-hydroxy-2-propyl)ketone (HMPK), thioxanthone ammonium salt (QTX), and benzophenone ammonium salt (ABQ) are preferred.

Further, in view of compatibility with polymer compounds according to the present invention, more preferred are 4-(2-hydroxyethoxy)phenyl-(2-hydroxy-2-propyl)ketone (n 1, HMPK, and ethylene oxide addition products (n=2–5) thereof.

Formula (10)

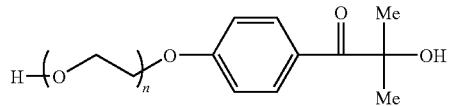

In above Formula (10), n represents an integer of 1-5.

Further, examples of other photopolymerization initiators include benzophenones such as benzophenone, hydroxybenzophenone, bis-N,N-dimethylaminobenzophenone, bis-N,N-diethylaminobenzophenone, or 4-methoxy-4'-dimethylaminobenzophenone; thioxanthones such as thioxanthone, 2,4-diethylthioxanthone, isopropylthioxanthone, chlorothioxanthone, or isoproxycycloxanthone; anthraquinones such as ethylanthraquinone, benzanthraquinone, aminoanthraquinone, or chloroanthraquinone; acetophenones; benzoin ethers such as benzoin methyl ether; 2,4,6-trihalomethyltriazines; 1-hydroxycyclohexyl phenyl ketone, 2-(o-chlorophenyl)-4,5-diphenylaimizazole dimers, 2-(o-chlorophenyl)-4,5-di(methoxyphenyl)imidazole dimers, 2-(fluorophenyl)-4,5-phenylimidazole dimers, 2-(o-methoxyphenyl)-4,5-phenylimidazole dimers, 2-(p-methoxyphenyl)-4,5-diphenylimidazole dimers, 2-di(p-methoxyphenyl)-5-phenylimidazole dimers, 2,4,5-triarylimidazole dimers of 2-(2,4-dimethoxyphenyl)-4,5-diphenylimidazole dimers, benzyl methyl ketal, 2-benzyl-2-dimethylamino-1-(4-morpholinophenyl)butane-1-one, 2-methyl-1-[4-(methylthio) phenyl]-2-morpholino-1-propane, 2-hydroxy-2-methyl-1-phenyl-propane-1-one, 1-[4-(2-hydroxyethoxy)-phenyl]-2-hydroxy-2-methyl-lpropane-1-one, phenanthlenequinone, 9,10-phenthelenequinone; benzoins such as methylbenzoin, or ethyl benzoin; and acridine derivatives such as 9-phenylacridine or 1,7-bis(9,9'-acrydinyl)heptane; and bisacylphosphine oxide; and mixtures thereof. The above compounds may be employed individually or in combinations.

It is possible to incorporate promoters together with these photopolymerization initiators. Examples of such include ethyl p-dimethylaminobenzoate, isoamyl p-dimethylaminobenzoate, ethanolamine, diethanolamine, and triethanolamine.

The side chains of these photopolymerization initiators undergo graft polymerization with respect to the hydrophilic main chain.

(Actinic Radiation and Exposure Method)

In the image forming method of the present invention, ink, incorporating the actinic energy curable polymer compounds, is ejected onto a recording medium to form images, which are subsequently cured under exposure to actinic radiation.

Actinic radiation, as described in the present invention, includes, for example, electron beams, ultraviolet rays, α rays, β rays, γ rays, and X rays. In view of danger to the human body, ease of handling, and wide industrial application, preferred are electron beams and ultraviolet rays.

When electron beams are employed, their exposure amount is preferably in the range of 0.1-30 Mrad. When the exposure amount is less than 0.1 Mrad, desired exposure effects are not sufficiently realized, while when it exceeds 30 Mrad, recording media may be degraded. Therefore, the radiation amount beyond the above range is not preferred.

When ultraviolet rays are employed, employed are conventional radiation sources such as low, medium, or high pressure mercury lamps exhibiting a driving pressure of 0.1 kPa-1 MPa, metal halide lamps, xenon lamps emitting radiation in the ultraviolet region, cold cathode tubes, hot cathode tubes, or LEDs.

(Radiation Exposure Conditions after Ink Deposition)

As exposure conditions of actinic radiation, it is preferable that actinic radiation is exposed within 0.001-1.0 second after deposition of ink droplets onto a recording medium, but is it more preferable that it is exposed within 0.001-0.5 second after the same. In order to form highly detailed images, it is critical that the exposure timing is early as possible.

(Arrangement of Lamps)

A basic actinic radiation exposure method is disclosed in JP-A No. 60-132767. According to it, exposure radiation sources are arranged on both sides of the ink-jet head unit, and the ink-jet head and the exposure radiation source are scanned via a shuttle system. Exposure is carried out a definite duration after deposition of ink droplets. Further, a method is known in which curing is completed employing another radiation source which is not accompanied with drive. For example, U.S. Pat. No. 6,145,979 discloses a method in which, as an exposure method, optical fibers are employed, and a collimated radiation beam is incident to a mirror surface arranged on the head unit side and actinic radiation is exposed to the recording section. Employed as image forming methods of the present invention, may be any of the above methods.

Further, the following method is also one of the preferred embodiments. Exposure to actinic radiation is divided into two stages. As a first stage, actinic radiation is exposed in the same manner as above within 0.001-2.0 seconds after deposition of ink droplets, followed by exposure to a second actinic radiation. By dividing the exposure to actinic radiation into two stages, it is possible to minimize contraction of the recording medium, which tends to occur during ink curing.

(Colorants)

Employed as colorants used in the ink-jet ink according to the present invention may be various conventional dyes and pigments known in the ink-jet systems. However, based on combinations of ionicity of the side chain of actinic radiation cross-linking type polymer compounds, preferred are those which are anionic.

(Dyes)

Employable dyes in the present invention are not particularly limited, and include water-soluble dyes such as acid dyes, direct dyes, or reactive dyes, as well as disperse dyes. Of these, preferred are anionic dyes.

Cited as water-soluble dyes usable in the present invention may, for example, be azo dyes, methine dyes, azomethine dyes, xanthene dyes, quinone dyes, phthalocyanine dyes, triphenylmethane dyes, and diphenylmethane dyes. Specific examples are listed below, however, the present invention is not limited thereto.

<C.I. Acid Yellow>
1, 3, 11, 17, 18, 19, 23, 25, 36, 38, 40, 42, 44, 49, 59, 61, 65, 67, 72, 73, 79, 99, 104, 110, 114, 116, 118, 121, 127, 129, 135, 137, 141, 143, 151, 155, 158, 159, 169, 176, 184, 193, 200, 204, 207, 215, 219, 220, 230, 232, 235, 241, 242, 246, <C.I. Acid Orange>
3, 7, 8, 10, 19, 24, 51, 56, 67, 74, 80, 86, 87, 88, 89, 94, 95, 107, 108, 116, 122, 127, 140, 142, 144, 149, 152, 156, 162, 166, 168, <C.I. Acid Red>
88, 97, 106, 111, 114, 118, 119, 127, 131, 138, 143, 145, 151, 183, 195, 198, 211, 215, 217, 225, 226, 249, 251, 254, 256, 257, 260, 261, 265, 266, 274, 276, 277, 289, 296, 299, 315, 318, 336, 337, 357, 359, 361, 362, 364, 366, 399, 407, 415, <C.I. Acid Violet>
17, 19, 21, 42, 43, 47, 48, 49, 54, 66, 78, 90, 97, 102, 109, 126, <C.I. Acid Blue>
1, 7, 9, 15, 23, 25, 40, 62, 72, 74, 80, 83, 90, 92, 103, 104, 112, 113, 114, 120, 127, 128, 129, 138, 140, 142, 156, 158, 171, 182, 185, 193, 199, 201, 203, 204, 205, 207, 209, 220, 221, 224, 225, 229, 230, 239, 249, 258, 260, 264, 278, 279, 280, 284, 290, 296, 298, 300, 317, 324, 333, 335, 338, 342, 350, <C.I. Acid Green>
9, 12, 16, 19, 20, 25, 27, 28, 40, 43, 56, 73, 81, 84, 104, 108, 109, <C.I. Acid Brown>
2, 4, 13, 14, 19, 28, 44, 123, 224, 226, 227, 248, 282, 283, 289, 294, 297, 298, 301, 355, 357, 413, <C.I. Acid Black>
1, 2, 3, 24, 26, 31, 50, 52, 58, 60, 63, 107, 109, 112, 119, 132, 140, 155, 172, 187, 188, 194, 207, 222, <C.I. Direct Yellow>
8, 9, 10, 11, 12, 22, 27, 28, 39, 44, 50, 58, 79, 86, 87, 98, 105, 106, 130, 132, 137, 142, 147, 153, <C.I. Direct Orange>
6, 26, 27, 34, 39, 40, 46, 102, 105, 107, 118, <C.I. Direct Red>
2, 4, 9, 23, 24, 31, 54, 62, 69, 79, 80, 81, 83, 84, 89, 95, 212, 224, 225, 226, 227, 239, 242, 243, 254, <C.I. Direct Violet>
9, 35, 51, 66, 94, 95, <C.I. Direct Blue>
1, 15, 71, 76, 77, 78, 80, 86, 87, 90, 98, 106, 108, 160, 168, 189, 192, 193, 199, 200, 201, 202, 203, 218, 225, 229, 237, 244, 248, 251, 270, 273, 274, 290, 291, <C.I. Direct Green>
26, 28, 59, 80, 85, <C.I. Direct Brown>
44, 106, 115, 195, 209, 210, 222, 223, <C.I. Direct Black>
17, 19, 22, 32, 51, 62, 108, 112, 113, 117, 118, 132, 146, 154, 159, 169, <C.I. Basic Yellow>
1, 2, 11, 13, 15, 19, 21, 28, 29, 32, 36, 40, 41, 45, 51, 63, 67, 70, 73, 91, <C.I. Basic Orange>
2, 21, 22, <C.I. Basic Red>
1, 2, 12, 13, 14, 15, 18, 23, 24, 27, 29, 35, 36, 39, 46, 51, 52, 69, 70, 73, 82, 109, <C.I. Basic Violet>
1, 3, 7, 10, 11, 15, 16, 21, 27, 39, <C.I. Basic Blue>
1, 3, 7, 9, 21, 22, 26, 41, 45, 47, 52, 54, 65, 69, 75, 77, 92, 100, 105, 117, 124, 129, 147, 151, <C.I. Basic Green>
1, 4, <C.I. Basic Brown>
1, <C.I. Reactive Yellow>
2, 3, 7, 15, 17, 18, 22, 23, 24, 25, 27, 37, 39, 42, 57, 69, 76, 81, 84, 85, 86, 87, 92, 95, 102, 105, 111, 125, 135, 136, 137, 142, 143, 145, 151, 160, 161, 165, 167, 168, 175, 176, <C.I. Reactive Orange>
1, 4, 5, 7, 11, 12, 13, 15, 16, 20, 30, 35, 56, 64, 67, 69, 70, 72, 74, 82, 84, 86, 87, 91, 92, 93, 95, 107, <C.I. Reactive Red>
2, 3, 5, 8, 11, 21, 22, 23, 24, 28, 29, 31, 33, 35, 43, 45, 49, 55, 56, 58, 65, 66, 78, 83, 84, 106, 111, 112, 113, 114, 116, 120, 123, 124, 128, 130, 136, 141, 147, 158, 159, 171, 174, 180, 183, 184, 187, 190, 193, 194, 195, 198, 218, 220, 222, 223, 228, 235, <C.I. Reactive Violet>
1, 2, 4, 5, 6, 22, 23, 33, 36, 38, <C.I. Reactive Blue>
2, 3, 4, 5, 7, 13, 14, 15, 19, 21, 25, 27, 28, 29, 38, 39, 41, 49, 50, 52, 63, 69, 71, 72, 77, 79, 89, 104, 109, 112, 113, 114, 116, 119, 120, 122, 137, 140, 143, 147, 160, 161, 162, 163, 168, 171, 176, 182, 184, 191, 194, 195, 198, 203, 204, 207, 209, 211, 214, 220, 221, 222, 231, 235, 236, <C.I. Reactive Green>
8, 12, 15, 19, 21, <C.I. Reactive Brown>
2, 7, 9, 10, 11, 17, 18, 19, 21, 23, 31, 37, 43, 46, <C.I. Reactive Black>
5, 8, 13, 14, 31, 34, 39, <C.I. Food Black>
1, 2.

Employed as pigments usable in the present invention may be conventional organic or inorganic pigments known in the art. Examples include azo pigments such as azo lakes, insoluble azo pigments, condensed azo pigments, or chelate azo pigments; polycyclic pigments such as phthalocyanine pigments, perylene and perylene pigments, antharaquinone pigments, quinacridone pigments, dioxazine pigments, thioindigo pigments, iso-indolinone pigments, or quinophtahrony pigments; dye lakes such as basic dye type lakes or acidic dye type lakes; organic pigments such as nitro pigments, nitroso pigments, aniline black, or daylight fluorescent pigments, and inorganic pigments such as carbon black. Among them, anion pigments are preferable.

Specific organic pigments are exemplified below.

Listed as pigments for magenta or red are C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 177, C.I. Pigment Red 178, C.I. and Pigment Red 222.

Listed as pigments for orange or yellow are C.I. are Pigment Orange 31, C.I. Pigment Orange 43, C.I. Pigment Yellow 12, C.I. Pigment Yellow 13, C.I. Pigment Yellow 14, C.I. Pigment Yellow 15, C.I. Pigment Yellow 17, C.I. Pigment Yellow 74, C.I. Pigment Yellow 93, C.I. Pigment Yellow 94, C.I. Pigment Yellow 128, and C.I. Pigment Yellow 138.

Listed as pigments for green or cyan are C.I. Pigment Blue 15, C.I. Pigment Blue 15:2, C.I. Pigment Blue 15:3, C.I. Pigment Blue 16, C.I. Pigment Blue 60, and C.I. Pigment Green 7.

A water-soluble polymer dispersant preferably utilized in ink of this invention is preferably the following water-soluble resin with respect to ejection stability.

Water-soluble resins preferably utilized include such as styrene-acrylic acid-acrylic acid alkyl ester copolymer, styrene-acrylic acid copolymer, styrene-maleic acid-acrylic acid alkyl ester copolymer, styrene-methacrylic acid copolymer, styrene-mathacrylic acid-acrylic acid alkyl ester copolymer, styrene-maleic acid half ester copolymer, vinyl naphthalene-acrylic acid copolymer and vinyl naphthalene-maleic acid copolymer.

The content of a water-soluble resin against the total ink is preferably 0.1-10 weight % and more preferably 0.3-5 weight %.

These water-soluble resins may also be utilized in combination of at least two types.

<Anionic Pigments>

In view of dispersion stability, it is preferable that anionic pigments employed in the present invention are in the state in which the above pigments are dispersed employing anionic polymer dispersing agents, or are anion-modified self-dispersing pigments.

Anionic polymer dispersing agents, as described herein, refer to dispersing agents having an anionic group, which are prepared by neutralizing, via basic compounds, the acidic group incorporated in the molecule. Cited as basic compounds employed for neutralization are hydroxides of alkaline metals such as sodium hydroxide or potassium hydroxide, as well as amines such as ammonia, alkylamine, or alkanolamine. In the present invention, amines are particularly preferred.

Anionic polymer dispensing agents preferably employed in the present invention are not particularly limited as long as the molecular weight is at least 1,000. Examples include polyvinyl alcohols, polyvinylpyrrolidones, acryl based resins such as polyacrylic acid, acrylic acid-acrylonitrile copolymers, potassium acrylate-acrylonitrile copolymers, vinyl acetate-acrylic acid ester copolymers, acrylic acid-acrylic acid ester copolymers; acryl based resins such as styrene-acrylic acid copolymers or styrene-methacrylic acid copolymers; styrene-acryl resins such as styrene-acrylic acid copolymers, styrene-methacrylic acid copolymers, styrene-methacrylic acid-acrylic acid ester copolymers, styrene-α-methylstyrene-acrylic acid copolymers, or styrene-α-methylstyrene-acrylic acid-acrylic acid ester copolymers; styrene-maleic acid copolymers, styrene-maleic anhydride copolymers, vinyl acetate based copolymers such as vinylnaphthalene-acrylic acid copolymers, vinylnaphthalene-maleic acid copolymers, vinyl acetate-ethylene copolymers, vinyl acetate-fatty acid vinylethylene copolymers, vinyl acetate-maleic acid ester copolymers, vinyl acetate-crotonic acid copolymers, vinyl acetate-acrylic acid copolymers and salts thereof, or resins which include for example homopolymers, copolymers, and terpolymers which exhibit functional properties of, for example, carboxylic acid, sulfonic acid, or phosphonic acid. Examples of monomers which result in acid functionality include acrylic acid, methacrylic acid, crotonic acid, maleic acid, maleic anhydride, itaconic acid, mesaconic acid, fumaric acid, citraconic acid, vinyl acetate, acryloxypropionic acid, vinylsulfonic acid, styrenesulfonic acid, 2-acrylamido-2-methylpropanesulfonic acid, allylsulfonic acid, allylphosphonic acid, vinylphosphonic acid, and vinylsulfonic acid.

Anion modifying self-dispersion pigments preferably employed in the present invention, as described herein, refer to pigments having an anionic group on the surface, capable of being dispersed without special dispersing agents. The anionic self-dispersion pigments refer to pigments which are modified by an acidic group which is neutralized by basic compounds to form an anionic group, whereby dispersion in water is enabled without dispersing agents.

The term, "pigment particles having an acidic group on the surface", refers to pigments in which the surface of pigment particles is directly modified by an acidic group, or in organic materials, having an organic pigment mother nucleus, an acidic group is linked directly or via a bond.

Cited as acidic groups (also referred to as polar groups) are, for example, a sulfonic acid group, a carboxylic acid group, a phosphoric acid group, a boric acid group, and a hydroxyl group. Of these, preferred are a sulfonic acid group and a carboxylic acid group, and of these, the sulfonic acid group is more preferred.

Listed as modifying agents of the acidic group are sulfur incorporating processing agents such as sulfuric acid, fuming sulfuric acid, sulfur trioxide, chlorosulfuric acid, fluorosulfuric acid, amidosulfuric acid, sulfonated pyridine salts, or sulfamic acid, and carboxylating agents which oxidize the surface of pigment particles to result in introduction of a carboxyl group such as sodium hypochlorite or potassium hypochlorite. Of these, preferred are sulfonating agents such as sulfur trioxide, sulfonated pyridine salts or sulfamic acid, and carboxylating agents. Listed as basic compounds to neutralize an acidic group are alkaline metal hydroxides such as sodium hydroxide or potassium hydroxide, and amines such as ammonia, alkylamine, or alkanolamine. In the present invention, particularly preferred are amines.

Methods to prepare pigment particles having a polar group on their surface are described, for example, in WO 97/48769, as well as in JP-A Nos. 10-110129, 11-246807, 11-57458, 11-189739, 11-323232, and 2002-265094, wherein polar groups such as a sulfonic acid group or salts thereof are introduced onto at least some part of the particle surface while oxidizing the surface of pigment particles employing suitable oxidizing agents. In practice, carbon black is oxidized by concentrated nitric acid, and in the case of color pigments, they may be prepared upon being oxidized via sulfamic acid, sulfonated pyridine salts, or amidosulfuric acid in sulfolane or N-methyl-2-pyrrolidone. Oxidation is carried out employing such reactions and those which are modified to be water-soluble are removed and purification is conducted, whereby it is possible to prepare a pigment dispersion. Further, when a sulfonic acid group is introduced onto the surface via oxidation, if desired, the acidic group may be neutralized employing basic compounds.

Other methods include one in which the pigment derivatives, described in JP-A Nos. 11-49974, 2000-273383, and 2000-303014 are adsorbed onto the surface of pigment particles employing processes such as milling, and another in which the pigments, described in JP-A Nos. 2002-179977 and 2002-201401, are dissolved in solvents together with pigment derivatives and then crystallized into poor solvents. By employing any of the above methods, it is possible to readily prepare pigment particles having a polar group on their surfaces.

In the present invention, the polar group may be free or in the state of a salt, or may have a counter salt. Examples of counter salts include inorganic salts (for example, salts of lithium, sodium, potassium, magnesium, calcium, aluminum, nickel, and ammonium), and organic salts (for example, trimethyl ammonium, diethyl ammonium, pyridium, and triethanol ammonium). Of these, preferred are counter salts exhibiting univalence.

The average particle diameter of the pigment dispersion employed in the ink-jet ink according to the present invention is preferably at most 500 nm, is more preferably at most 200 nm, is still more preferably 10-200 nm, but is most preferably 10-150 nm. When the average particle diameter of the pigment dispersion exceeds 500 nm, dispersion is unstable, while when it is less than 10 nm, the stability of the pigment dispersion tends to be uneatable, whereby storage stability of the ink tends to degrade.

It is possible to determine the particle diameter of a pigment dispersion employing commercial particle size meters employing a light scattering method, an electrophoresis method, or a laser Doppler method. Alternatively, images of at least 100 particles are captured by a transmission type electron microscope, and the captured images are statistically treated employing an image analysis software such as IMAGE-PRO (produced by Media Cybernetics), whereby it is possible to obtain the particle diameter.

Listed as methods for dispersing pigments are those employing various homogenizers such as a ball mill, a sand mill, an attritor, a roller mill, an agitator, a Henschel mixer, a colloid mill, an ultrasonic homogenizer, a pearl mill, a wet system jet mill, or a paint shaker.

An amount of a water-dispersed colorant or a water-soluble colorant in an ink-jet ink of the present invention is preferably 1 to 10 weight % based on the total weight of the ink-jet ink.

<Water-Soluble Organic Solvents>

Water-soluble organic solvents utilizable in this invention include, for example, alcohols (such as methanol, ethanol, propanol, isopropanol, butanol, isobutanol, secondary butanol, tertiary butanol, pentanol, hexanol, cyclohexanol and benzyl alcohol), polyhydric alcohols (such as ethylene glycol, diethylene glycol, triethylene glycol, polyethylene glycol, propylene glycol, dipropylene glycol, polypropylene glycol, butylene glycol, hexanediol, pentanediol, glycerin, hexanetriol and thiodiglycol), polyhydric alcohol ethers (such as ethylene glycol monomethylether, ethylene glycol monoethylether, ethylene glycol monobutylether, diethylene glycol monomethylether, diethylene glycol monoethylether, diethylene glycol monobutylether, propylene glycol monomethylether, propylene glycol monobutylether, ethylene glycol monomethylether acetate, triethylene glycol monomethylether, triethylene glycol monoethylether, triethylene glycol monobutylether, ethylene glycol monophenylether and propylene glycol monophenylether), amines (such as ethanolamine, diethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentamethyl diethyltriamine and tetramethyl propylenediamine), amides (such as formamide, N,N-dimethyl formamide and N,N-dimethylacetoamide), heterocyclic rings (such as 2-pyrrolidone, N-methyl-2-pyrrolidone, cyclohexyl pyrrolidone, 2-oxazolidone, 1,3-dimethyl-2-imidazolydinone), sulfoxides (such as dimethylsulfoxide).

<Surface Active Agents>

Surface active agents usable in the present invention are not particularly limited, listed examples being anionic surface active agents such as dialkylsulfosuccinic acid salts, alkylnaphthalenesulfonic acid salts, or fatty acid salts; nonionic surface active agents such as polyoxyethylene alkyl ethers, polyoxyethylene alkyl allyl ethers, acetylene glycols, or polyoxyethylene-polyoxypropylene block copolymers; and cationic surface active agents such as alkylamines or quaternary ammonium salts.

The above-described surface active agents can be used for dispersing pigments. Of these, particularly preferably employed are anionic surface active agents and nonionic <Various Additives>

Other than each of the above additives, it is possible to incorporate in the ink-jet ink according to the present invention conventional additives known in the art. Examples include optical brightening agents, defoamers, lubricants, antiseptics, thickening agents, antistatic agents, matting agents, water-soluble polyvalent metal salts, acid-bases, pH controlling agents such as a buffer, antioxidants, surface tension controlling agents, resistivity controlling agents, anticorrosives, and inorganic pigments.

(Recording Media)

Recording media usable in the image recording method of the present invention are not particularly limited. For example, employed may be plain paper, absorptive supports such as wood-free paper, low absorptive recording media such as art paper or coated paper, non-absorptive media such as film, and ink-jet recording media. Of these, it is preferable to employ plain paper, low absorptive recording media such as art paper or coated paper, and non-absorptive media since it is possible to fully realize targeted effects of the image recording method of the present invention.

Paper includes coated paper and non-coated paper. Coated paper includes art paper in which the coated amount on one side is approximately 20 $g/m^2$, coated paper in which the coated amount on one side is approximately 10 $g/m^2$, light weight coated paper in which the coated amount on one side is approximately 5 $g/m^2$, ultra light weight coated paper, matte finished coated paper, double tone finished double coated paper, and newsprint paper. Non-coated paper includes printing paper A employing 100 percent chemical pulp, printing paper B employing at least 70 percent chemical pulp, printing paper C employing from 40 to 70 percent chemical pulp, printing paper D employing at most 40 percent chemical pulp, and gravure paper which incorporates mechanical pulp and has been subjected to calendering. More detailed reference will be made to "Saishin Kamikako Binran (Handbbok of Recent Paper Treatments)", edited by Kako Binran Henshuiinkai Hen, published by Tech Times and "Insatsu Kogaku Binran (Printing Engineering Handbook)", edited by Nihon Insatsu Gakkai.

Employed as plain paper, are 80-200 μm thick non-coated paper which belongs to a part of non-coated paper sheets, special printing paper sheets, and information sheets. Examples include high quality printing paper, medium quality printing paper, and low quality printing paper, thin printing paper, ultra-thin printing paper, or special printing paper such as high quality colored paper, form paper sheets, PPC sheets, and other kinds such as information sheets. Specifically, available are the paper sheets described below and various modified/treated paper sheets, but the present invention is not limited thereto.

Listed are HIGH QUALITY PAPER, HIGH QUALITY COLORED PAPER, RECYCLED PAPER, COPYING PAPER/COLOR, OCR PAPER, NON-CARBON PAPER/SYNTHETIC PAPER such as UPO 60, 80, and 110 MICRON, or UPOCOAT 70 and 90 MICRON, others such as ONE SIDE ART PAPER 68 kg, COATED PAPER 90 kg, MATTE FORM PAPER 70, 90, and 110 kg, FOAMED PET 38 micron, and MITSUORIKUN (all available from Kobayashi Kirokushi Co., Ltd.), OK HIGH QUALITY PAPER, NEW OK HIGH QUALITY PAPER, SUN FLOWER, PHOENIX, OK ROYAL WHITE, HIGH QUALITY EXPORT PAPER (NPP, NCP, NWP, and ROYAL WHITE), OK BOOK PAPER, OK CREAM BOOK PAPER, CREAM HIGH QUALITY PAPER, OK MAP PAPER, OK ISHIKARI, KYUUREI, OK FORM, OKH, and NIP-N (all available from Shin-Oji Paper Co., Ltd.); KINO, TOKO, EXPORT HIGH QUALITY PAPER, SPECIAL DEMAND HIGH QUALITY PAPER, BOOK PAPER, BOOK PAPER L, PALE CREAM BOOK PAPER, PRIMARY SCHOOL SCIENCE TEXT BOOK PAPER, CONTINUOUS SLIP PAPER, HIGH QUALITY NIP PAPER, GINKAN, KINYO, KINYO (W), BRIDGE, CAPITAL, GINKAN BOOK PAPER, HARP, HARP CREAM, SK COLOR, SECURITY PAPER, OPERA CREAM, OPERA, KYP CARTE, SYLVIA HN, EXCELLENT FORM, and NPI FORM DX (all available from Nippon Paper Co., Ltd.); PEARL, KINRYO, PALE CREAM HIGH QUALITY PAPER, SPECIAL BOOK PAPER, SUPER BOOK PAPER, DIAFORM, and INK-JET FORM (all available from Mitsubishi Paper Mills Ltd.); KINMO V, KINMO SW, HAKUZO, HIGH QUALITY PUBLISHING PAPER, CREAM KINMO, CREAM HAKUZO, SECURITY/TRADABLE COUPON PAPER, BOOK PAPER, MAP PAPER, COPY PAPER, and HNF (all available from Hokuetsu Paper Mills, Ltd.); SIORAI, TELEPHONE DIRECTORY COVER, BOOK PAPER, CREAM SHIORAI, CREAM SHIORAI MEDIUM ROUGH, CREAM SHIORAI HIGH ROUGH, and DSK (all available from Daishowa Paper Manufacturing Co., Ltd.); SENDAI MP HIGH QUALITY PAPER, KINKO, RAICHO HIGH QUALITY, HANGING PAPER, COLORED PAPER BASE PAPER, DICTIONARY PAPER, CREAM BOOK, WHITE BOOK, CREAM HIGH QUALITY PAPER, MAP PAPER, and CONTINUOUS SLIP PAPER (Chuetsu Paper & Pulp Co., Ltd.); OP KINO (CHUETSU), KINSA, REFERENCE PAPER, TRADABLE COUPON PAPER (WHITE)), FORM PRINTING PAPER, KRF, WHITE FORM, COLOR FORM, (K)NIP, FINE PPC, and KISHU INK-JET PAPER (all produced by Kishu Paper Co., Ltd.); TAIOU, BRIGHT FORM, KANT, KANT WHITE, DANTE, CM PAPER, DANTE COMIC, HEINE, PAPER BACKS PAPER, HEINE S, NEW AD PAPER, UTRILLO EXCEL, EXCEL SUPER A, KANTO EXCEL, EXCEL SUPER B, DANTE EXCEL, HEINE EXCEL, EXCEL SUPER C, EXCEL SUPER D, AD EXCEL, EXCEL SUPER E, NEW BRIGHT FORM, and NEW BRIGHT NIP (all available from Daio Paper Corporation); NICHIRIN, GETSURIN, UNREI, GINGA, HAKUUN, WAISU, GETURIN ACE, RAKUUN ACE, and UNKIN ACE (all produced by Japan Paper Industry Co., Ltd.); TAIOU, BRIGHT FORM and BRIGHT NIP (all avaialbew from Nagoya Pulp Co., Ltd.); BOTAN A, KINBATO, TOKU BOTAN, SHIROBOTAN A, SHIROBOTAN C, GINBATO, SUPER SHIROBOTAN A, PALE CREAM SHIROBOTAN, SPECIAL MEDIUM QUALITY PAPER, SHIROBATO, SUPER MEDIUM QUALITY PAPER, AO BATO, AKA BATO, KIN BATO M SNOW VISION, KIN BATO SNOW VISION, SHIRO BATO M, SUPER DX, HANAMASU O, AKA BATO M, and HK SUPER PRINTING PAPER (all manufactured by Honshu Paper Co., Ltd.); STAR LINDEN (A·AW), STAR ELM, STAR MAPLE, STAR LAUREL; STAR POPLAR, MOP, STAR CHERRY I, CHERRY I SUPER, CHERRY II SUPER, STAR CHERRY III, STAR CHERRY IV, CHERRY III SUPER, and CHERRY IV SUPER (all produced by Marusumi Paper Co., Ltd.); SHF (produced by Toyo Pulp Co., Ltd.); and TRP (produced by Tokai Pulp Co., Ltd.).

Further, employed as non-absorptive media may be any of the various films commonly employed. Examples include polyester film, polyolefin film, polyvinyl chloride film, and polyvinylidene chloride film. Further employed may be resin coated paper (RC paper prepared by covering both sides of a paper substrate with olefin resins) and YUPO paper, which is synthetic medium.

Further, various ink-jet recording media are prepared in such a manner that an absorptive or non-absorptive support is employed as a substrate and an ink receptive layer is formed on its surface. Some of ink receptive layers are composed of a coated layer, a swelling layer, and a minute void layer. The swelling layer absorbs ink while an ink receptive layer composed of water-soluble polymers swells. The minute void layer is composed of minute inorganic or organic particles of a secondary particle diameter of about 20-about 200 nm, and binders, and minute voids of about 100 nm absorb ink.

EXAMPLES

The present invention will now be described with reference to examples, however the present invention is not limited thereto. In examples, "parts" or "%" is employed and represents "parts by weight" or "% by weight", respectively, unless otherwise specified.

<<Synthesis of Polymer Compound>>

After dissolving, while heated, 100 g of polyacrylic acid (at a weight average molecular weight of 800,000) in 750 g of methanol, 16 g of 4-hydroxybutyl acrylate glycidyl ether and 11 g of pyridine as a catalyst were added. The temperature was maintained at 60° C. and stirring was carried out for 24 hours. Further, temperature of the system was raised to 95° C., and methanol was distilled off while dripping water thereto. Thereafter, an ion-exchanged resin (PK-216H, produced by Mitsubishi Chemical Corp.) treatment was carried out and pyridine was removed, whereby an aqueous solution of non-volatile components at a concentration of 15% was obtained. Subsequently, IRUGACURE 2959 (produced by Ciba Specialty Chemicals Co., Ltd.) was blended at a ratio of 0.1 g with respect to 100 g of the 15% aqueous solution. Thereafter, the resultant solution was diluted by ion-exchanged water, whereby a 10% aqueous Polymer Compound 1 solution was prepared.

<<Preparation of Inks>>

(Preparation of Ink Set 1: Dye Ink)

(Preparation of Magenta Ink 1)

| | |
|---|---|
| C.I. Acid Red 35 | 5 parts |
| Aqueous Polymer Compound 1 solution (10% solids) | 30 parts |
| Glycerin | 7 parts |
| Diethylene glycol | 15 parts |
| Diethylene glycol monobutyl ether | 2 parts |
| OLFIN E1010 (produced by Nissin Kagaku Co.) | 0.2 part |

Ion-exchanged water was added to the above to reach 100 parts, whereby Magenta Ink 1, which was a water-soluble ink, was prepared.

(Preparation of Black Ink 1)

Black Ink 1 was prepared in the same manner as above Magenta Ink 1, except that C. I. Acid Red was replaced with C. I. Direct Black 19.

(Preparation of Ink Set 2: Pigment Ink)

(Preparation of Pigment Dispersion)

(Preparation of Magenta Pigment Dispersion)

The following additives were blended and the resultant mixture was dispersed employing a sand grinder loaded with 0.6 mm zirconia beads at a volume ratio of 50%, whereby a magenta pigment dispersion at a magenta pigment content of 15% was prepared. The average diameter of the magenta pigment particles incorporated in the resultant magenta pigment dispersion was 90 nm. The particle diameter was determined employing ZETA SIZER 1000HS produced by Malvern Co.

| | |
|---|---|
| C.I. Pigment Red 122 | 15 parts |
| JOHNCRYL 61 (styrene acryl based resin dispersing agent at 30% solids, produced by Johnson Co.) | 10 parts |
| Glycerin | 15 parts |
| Ion-exchanged water | 67 parts |

<Preparation of Black Pigment Dispersion>

Carbon black self-dispersion CABO-JET 300, produced by Cabot Co., was diluted with ion-exchanged water, whereby a black pigment dispersion at a content of carbon black of 10% was prepared. The average diameter of carbon black particles incorporated in the resultant black pigment dispersion was 153 nm. The particle diameter was determined employing ZETA SIZER 1000HS, produced by Malvern Co.

(Preparation of Magenta Ink 2)

| | |
|---|---|
| Magenta pigment dispersion (15% solids) | 20 parts |
| Polymer Compound 1 (10% solids) | 30 parts |
| Glycerin | 5 parts |
| Diethylene glycol | 15 parts |
| Diethylene glycol monobutyl ether | 2 parts |
| OLFIN E1010 (produced by Nissin Chemical Industry Co., Ltd.) | 0.2 part |

Ion-exchanged water was added to the above to reach 100 parts, whereby Magenta Ink 2, being a pigment ink, was prepared.

(Preparation of Black Ink 2)

| | |
|---|---|
| Black pigment dispersion (10% solids) | 20 parts |
| Polymer Compound 1 (10% solids) | 30 parts |
| Glycerin | 5 parts |
| Diethylene glycol | 15 parts |
| Diethylene glycol monobutyl ether | 2 parts |
| Olfin E1010 (produced by Nissin Chemical Industry Co., Ltd.) | 0.2 part |

Ion-exchanged water was added to the above to reach 100 parts, whereby Black Ink 2, being a pigment ink, was prepared.

(Preparation of Ink Set 3: Dye Ink)

Ink Set 3 (being a dye ink set) was prepared in the same manner as above Ink Set 1, except that Polymer Compound 1 employed to prepare each ink was replaced with a 10% aqueous polyvinyl alcohol solution (at a degree of polymerization of 2,000 and a saponification ratio of 88%).

(Preparation of Ink Set 4: Pigment Ink)

Ink Set 4 (being a pigment ink set) was prepared in the same manner as above Ink Set 2, except that Polymer Compound 1 employed to prepare each ink was replaced with a 10% aqueous polyvinyl alcohol solution (at a degree of polymerization of 2,000 and a saponification ratio of 88%).

(Preparation of Ink Set 5: Dye Ink)

Ink Set 5 (being a dye ink set) was prepared in the same manner as above Ink Set 1, except that Polymer Compound 1, employed to prepare each ink, was omitted.

(Preparation of Ink Set 6: Pigment Ink)

Ink Set 6 (being a pigment ink set) was prepared in the same manner as above Ink Set 2, except that Polymer Compound 1, employed to prepare each ink, was omitted.

<<Ink Ejection Method>>

<Ink Ejection Method 1>

By employing an on-demand type ink-jet printer of a maximum recording density of 360×360 dpi, fitted with a piezo type ink-jet head (of a nozzle aperture diameter of 30 μm, the number of nozzles of 64, and a nozzle density of 90 dpi) having two aperture sections, as shown in FIGS. 2(a) to 2(c), images were formed in such a manner that the ink amount was controlled to 20 pl, driving was carried out at a driving frequency of 200 μm, and the flow rate in the ink channel in the ink-jet head was controlled to 10 μl. The term "dpi", as described in the present inventions, represents the number of dots per 2.54 cm.

<Ink Ejection Method 2>

By employing an on-demand type ink-jet printer of a maximum recording density of 360×360 dpi, fitted with a piezo type ink-jet head (of a nozzle aperture diameter of 30 μm, the number of nozzles of 64, and a nozzle density of 90 dpi) having a single aperture section, shown in FIGS. 1(a) to 1(c), images were formed in such a manner that the ink in the ink-jet channel was fed corresponding to the amount consumed during ejection.

<<Image Formation>>

By employing Image Forming Methods 1-6 in which each of the ink sets and each of the ink ejection methods were combined as described in Table 1, ejection was carried out onto art paper (NK ART KINFUJI N, produced by Oji Paper Co., Ltd.) at a driving frequency of 5 kHz and 2.4 kHz. Subsequently, 0.1 second after deposition of the ink droplets, images formed by Ink Sets 1 and 2 were exposed employing a 120 W/cm metal halide lamp (MAL 400NL, produced by Japan Storage Battery Co., Ltd. at a source power of 3 kW·hr).

<<Evaluation of Each of Characteristics>>

(Evaluation of Ejection Stability)

Based on each of the above image forming methods, a solid magenta or black image was printed at a driving frequency of 5 kHz and 2.5 kHz, followed by exposure to ultraviolet radiation. Thereafter, the difference in densities between the driving frequencies of 5 kHz and 2.5 kHz was visually observed and ejection stability was evaluated based on the following criteria.

A: no difference in the solid image density between the driving frequencies was noted B: a slight difference in the solid image density between the driving frequencies was noted, but quality was within the commercially viable range C: obvious density difference between the driving frequencies was noted, which was recognized as significant difference in practice (Evaluation of Abrasion Resistance)

Based on the above image forming method, 200 μm wide magenta or black fine line images were printed onto art paper (NK ART KINFUJI N, produced by Oji Paper Co., Ltd.). Thereafter, images formed employing Ink Sets 1 and 2 were exposed to ultraviolet radiation. Three minutes later, the image surface was finger-rubbed back and forth 5 times, and then the resultant fine line image was visually observed. Abrasion resistance was evaluated based on the following criteria:

A: no change was noted in the printed image

B: when closely observed, slight abrasion was noted, but resulted in no problem for commercial viability C: an obvious decrease in image density was noted along with formation of abrasion marks, resulting in problems of commercial viability (Evaluation of Color Bleed Resistance)

Based on the above image forming method, an image pattern, in which black characters of differing point size were arranged on a solid magenta image, was outputted on art paper (NK KINFUJI N, produced by Oji Paper Co., Ltd.).

Subsequently, images formed by Ink Sets 1 and 2 were exposed 0.1 second after ink deposition, employing a 120 W/cm metal halide lamp (MAL 400NL at a light source power of 3 kW-hour, produced by Japan Storage Battery Co., Ltd.).

Color bleed of images, prepared as above, was visually observed and the color bleed was resistance was evaluated based on the following criteria:

A: no color bleed was noted

B: slight color bleed was noted, and it was possible to identify 5 point characters C: some color bleed was noted but it was possible to identify 7 point characters, resulting in the commercially viable range D significant color bleed was noted and it was not possible to identify even 9 point characters E: color bleed was pronounced and it was not possible to identify 9 point characters.

(Evaluation of Feathering Resistance)

Based on the above image forming methods, 100 μm wide fine black lines were printed on plain paper (FIRST CLASS PAPER, produced by Konica Minolta Business Technologies, Inc.). Subsequently, images formed via Ink Sets 1 and 2 were exposed 0.1 second after ink deposition, employing 120 W/cm metal halide lamp (MAL 400NL at a light source power of 3 kW·hour, produced by Nippon Cell Co.).

Bleed of fine lines, prepared as above, was visually observed and feathering resistance was evaluated based on the following criteria.

A: fine lines were clearly identified

B: slight feathering was noted, resulting in minimal adverse effects to fine lines C: formation of some feathering was noted, but was within the commercially viable range D: formation of feathering was pronounced, and quality was beyond the commercially viable range E: formation of feathering was severe and the boundary of fine lines was not clear, resulting in no commercial viability (Evaluation of Beading Resistance)

Based on the above image forming method, 10 cm×10 cm solid magenta images were printed on an art paper (NK ART KINFUJI N, produced by Oji Paper Co., Ltd.) and on fine-quality paper (FIRST CLASS PAPER, produced by Konica Minolta Busyness Technologies, Inc.). Subsequently, images formed by Ink Sets 1 and 2 were exposed 0.1 second after ink deposition, employing 120 W/cm metal halide lamp (MAL 400NL at a light source power of 3 kW·hour, produced by Japan Storage Battery Co., Ltd.).

The resultant images were visually observed and beading resistance was evaluated based on the following criteria.

A: an overall uniform image was formed

B: when carefully observed, fewer than 6 positions of non-uniform noise were noted C: when carefully observed, fewer than 12 positions of non-uniform noise were noted D: at least 12 positions of clear non-uniform noise were noted E: at least 20 positions of non-uniform noise were noted Table 1 shows the results.

TABLE 1

| Image Forming Method No. | Ink Set No. | Ink Ejection Method No. | Ejection Stability | Abrasion Resistance | Color Bleed Resistance | Feathering Resistance | Beading Resistance Art Paper | Plain Paper | Remarks |
|---|---|---|---|---|---|---|---|---|---|
| 1 | 1 | 1 | A | A | A | A | A | A | Present Invention |
| 2 | 2 | 1 | A | A | A | A | B | A | Present Invention |
| 3 | 3 | 1 | A | C | C | C | C | C | Present Invention |
| 4 | 4 | 1 | A | C | C | C | C | C | Present Invention |
| 5 | 5 | 1 | A | C | D | E | E | D | Comparative Example |
| 6 | 6 | 1 | A | D | D | E | E | D | Comparative Example |
| 7 | 1 | 2 | C | B | B | B | B | A | Comparative Example |
| 8 | 2 | 2 | C | B | B | B | B | A | Comparative Example |
| 9 | 3 | 2 | C | C | D | D | D | C | Comparative Example |
| 10 | 4 | 2 | C | D | D | C | D | C | Comparative Example |
| 11 | 5 | 2 | A | C | D | E | E | D | Comparative Example |
| 12 | 6 | 2 | A | D | D | E | E | D | Comparative Example |

As can clearly be seen from the results described in Table 1, compared to Comparative Examples, in the image forming method in which a polymer-incorporating ink-jet ink specified in the present invention, was ejected under an application of shear, ejection stability as well as abrasion resistance, color bleed resistance, feathering resistance and beading resistance were enhanced. Among those, specifically, when the ink was employed, which incorporated, as a polymer compound, compounds which had a plurality of side chains on the main chain, and are cross-linkable among side chains via exposure to actinic radiation, the above effects were more markedly pronounced.

What is claimed is:

1. A method of forming an image comprising the step of:
    ejecting droplets of an ink-jet ink comprising water, a colorant and a polymer through a nozzle of an ink-jet head onto an image recording medium,
    wherein the polymer comprises a hydrophilic main chain and a plurality of side chains which are capable of cross-linking between the side chains by irradiation with an active energy ray; and
    applying, continuously, a shearing stress to the ink-jet ink in an ink-jet head channel of the ink-jet head during the time when the ink-jet head is in a stand-by condition to eject the droplets of the ink-jet ink,
    wherein the ink-jet head channel of the ink-jet head has at least two aperture sections for the ink-jet ink, the shearing stress is continuously applied to the ink-jet ink by circulating the ink-jet ink from one aperture section to another aperture section; and a total flow volume of the ink-jet ink in the ink-jet head channel per a unit time is 10 to 10,000 times larger than a total volume of the ink-jet ink ejected from the nozzle.

2. The method of forming an image of claim 1, wherein the shearing stress applied to the ink-jet head in the ink-jet head channel is not less than 5 (l/s).

3. The method of forming an image of claim 1, wherein the colorant is anionic; and the side chain of the polymer is anionic or noninonic.

4. The method of forming an image of claim 1, wherein a content of the polymer in the ink-jet ink is from 0.5 to 5.0 weight % based on the total weight of the ink-jet ink.

5. The method of forming an image of claim 1, wherein a partial structure of the polymer comprising the main chain and the side chain is represented by Formula (A):
    wherein "Poly" represents a hydrophilic main chain; "$(X_1)_m$—[B—$(Y_1)_n$]" represents the side chain in which $X_1$ represents a (p+1) valent linking group, B represents a cross-linking group, and $Y_1$ represents a hydrogen atom or a substituent; m represents 0 or 1; n represents 0 or 1; and p represents an integer, provided that when p represents 2 or more, a plurality of B and $Y_1$ may be the same or different.

6. The method of forming an image of claim 1, wherein the hydrophilic main chain is a saponified vinyl acetate; the saponification ratio is 77-99%; and the degree of polymerization is 500-4,000.

7. The method of forming an image of claim 1, wherein the polymer has a modification ratio of the side chain with respect to the main chain in the range of 1-4 mol %.

8. The method of forming an image of claim 1, wherein a water-soluble photopolymerization initiator is further incorporated in the ink-jet ink.

9. The method of forming an image of claim 1, further comprising the steps of:
irradiating the ejected ink-jet ink on the image recording medium with an actinic ray; and then
drying the ink-jet ink.

10. The method of forming an image of claim 9, wherein the image recording medium is plain paper.

11. The method of forming an image of claim 9, wherein the image recording medium is art paper or coated paper.

12. The method of forming an image of claim 9, wherein the image recording medium is a non-absorptive medium.

* * * * *

UNITED STATES PATENT AND TRADEMARK OFFICE
CERTIFICATE OF CORRECTION

| | | |
|---|---|---|
| PATENT NO. | : 7,658,485 B2 | Page 1 of 1 |
| APPLICATION NO. | : 11/468892 | |
| DATED | : February 9, 2010 | |
| INVENTOR(S) | : Ishibashi et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 680 days.

Signed and Sealed this

Thirtieth Day of November, 2010

David J. Kappos
*Director of the United States Patent and Trademark Office*